United States Patent [19]

Yoshino

[11] Patent Number: 4,593,881
[45] Date of Patent: Jun. 10, 1986

[54] ELECTRONIC EXPANSION VALVE
[75] Inventor: Hozo Yoshino, Tokyo, Japan
[73] Assignee: System Homes Company, Ltd., Tokyo, Japan
[21] Appl. No.: 777,864
[22] Filed: Sep. 19, 1985

Related U.S. Application Data

[63] Continuation of Ser. No. 545,157, Oct. 25, 1983, abandoned.

[30] Foreign Application Priority Data

Oct. 27, 1982 [JP] Japan ........................ 57-187358

[51] Int. Cl.$^4$ .................... F16K 47/00; F25B 41/04
[52] U.S. Cl. .................... 251/124; 251/264; 251/282; 251/129.11; 62/204; 62/210
[58] Field of Search ............ 251/264, 282, 13.3, 251/124, 133, 122, 252, 249.5, 123, 124; 62/204, 205, 206, 210, 211, 212, 222, 223, 224, 225

[56] References Cited

U.S. PATENT DOCUMENTS

| 2,534,455 | 12/1950 | Hilkemeier | 62/202 |
| 3,180,260 | 4/1965 | Pavlin | 251/124 |
| 3,421,700 | 1/1969 | Seamans | 251/131 |
| 3,699,989 | 10/1972 | O'Connor | 251/131 |
| 3,756,282 | 9/1973 | Knutson | 251/133 |
| 4,084,120 | 4/1978 | Lund | 137/596.17 |

Primary Examiner—William E. Lyddane
Assistant Examiner—Gerald A. Anderson
Attorney, Agent, or Firm—Oblon, Fisher, Spivak, McClelland & Maier

[57] ABSTRACT

An electronic expansion valve comprising a stepping motor, motion conversion member for converting the rotational motion of the stepping motor to a screw motion, a valve pintle coupled to the motion conversion means to be rectilinearly displaced and having pistons at both ends of the valve pintle, of which the pistons are slidably supported on valve casing members, a valve body formed as an integral part of the valve pintle at an intermediate portion thereof, and a valve seat which has such an outer surface that when the valve pintle is displaced with respect to the valve seat in either direction, the cross sectional area and the shape of a passage defined between the valve seat and the valve pintle are smoothly varied. The valve can be used in refrigeration cycle with a compressor. Stable operation of the refrigeration cycle is obtained. The orifice contour created by a moving valve body and a valve seat is always maintained streamlined so that the friction loss therethrough is substantially reduced, whereby the coefficient of performance of the refrigeration cycle is improved.

10 Claims, 9 Drawing Figures

ELECTRONIC EXPANSION VALVE

This application is a continuation of application Ser. No. 545,157 filed Oct. 25, 1983, now abandoned.

BACKGROUND OF THE INVENTION

1. Field of the Invention

The present invention relates to an electronic expansion valve, which is particularly used in the refrigeration cycle with a compressor and more particularly to an electronic expansion valve in which a stepping motor is used to regulate expansion valve opening in response to the output signal from a digital control unit in such a way that the stable operation of the refrigeration cycle is achieved. Furthermore, the orifice contour created by a moving valve body and a valve seat is always maintained streamlined so that the friction loss therethrough is substantially reduced, whereby the coefficient of performance (COP) of the refrigeration cycle is improved.

2. Description of the Prior Art

In recent years, heat pumps are gaining popularity which provides both heating and cooling modes. They basically consist of two heat exchangers, a compressor and an expansion valve. However, both the nominal evaporating temperature and the nominal pressure difference across the orifice of the expansion valve are different between the heating and cooling modes. Even in the case of the heating mode, a necessary valve opening varies depending upon an outdoor temperature and a desired indoor temperature.

Automatic expansion valves are generally used in the conventional heat pumps which may be classified into a mechanical type and an electrical type. The mechanical expansion valves are further categorized into a constant pressure type and a constant temperature type and are widely employed in medium to large size heat pumps. The valve opening is controlled by balancing the force created by a diaphragm, bellows or a spring and the force resulting from the pressure in an evaporator or the pressure difference between the evaporator and the compressor inlet.

These mechanical expansion valves are typically designed and constructed for a given rotational speed or capacity of a compressor employed. Therefore, the efficiency of the heat pumps is optimum only for a predetermined external and load condition. When actual operating conditions should change, the efficiency of the heat pumps would decrease in general. Because of the difference in the operating conditions, it is not preferable to use the same mechanical expansion valve in both the heating and cooling modes. Instead, two expansion valves are generally used in this situation.

Recently, solar heat pump systems are becoming popular. They utilize a solar collector as the evaporator of the heat pump. In the heating mode, the solar energy is absorbed by the solar evaporator. In the cooling mode, the heat can be dissipated into the sky during nighttime using the same solar evaporator. The overall efficiency of the heat pump system with the solar evaporator can be substantially improved under these conditions. However, the expansion valve must be operated under widely changing external conditions. The mechanical expansion valve cannot meet this requirement.

Moreover, since the mechanical expansion valve has a non-linearity such as hysteresis, it does not offer a high degree of control accuracy. In addition, as there is no damping means, the refrigeration cycle tends to become unstable.

In order to resolve the above mentioned problems peculiar to the mechanical expansion valve, electric expansion valves are developed, in which the position of the valve body is controlled electrically in the following manner. State variables of the control system which are obtained by sensors such as temperature sensors are once converted into electrical analog signals. They in turn are passed through an electrical network, amplified and applied to a heater or a solenoid, controlling the position of the valve body. As compared with the mechanical expansion valve, the electric expansion valve has a wider dynamic range and can operate under various external conditions. Therefore, by using the electric expansion valve, the heat pump systems can be designed to cover wider operating conditions than is possible using the conventional mechanical expansion valve.

However, since the control law for the conventional electric expansion valve is incorporated in a hardware as an electric circuit, the actuator can perform only a simple operation. In the case of the thermoelectric expansion valve, since the actuator has a large time constant due to combined action of a heater and a bimetal, its response characteristic is unsatisfactory. Moreover, as the valve actuation is performed by a rectilinear motion, a high driving power is required. As a result, a direct current power supply for the heater must be large in capacity. Therefore, both the electric circuit and the actuator become bulky and complicated in structure.

In order to overcome some of the above problems, motor driven expansion valve is disclosed in U.S. Pat. No. 2,534,455 entitled "Refrigerating Control Apparatus", granted to L. B. Koontz to reduce the driving force. According to Koontz Patent, two sets of heat-responsive resistor and heater are provided at two different places along an evaporator coil in which the refrigerant passes and they constitute a bridge circuit for the measurement and actuation. In response to an unbalanced current produced when the superheat temperature deviates from a predetermined value, the motor is driven. The rotational motion of the motor is converted into the translational motion for opening or closing the expansion valve.

However, there are still some problems with the motor driven electric expansion valve. They are tabulated below:

(1) In general, these electric expansion valves cannot be closed completely. Therefore, a solenoid valve is required to close the refrigeration cycle. Furthermore, when the expansion valve is fully opened, the pressure difference across the valve cannot be made substantially zero.

(2) These electric expansion valves are generally of unidirectional type. Two expansion valves must be used for the heating and cooling modes. Alternatively, a four-way valve must be employed to make the flow in the valve unidirectional.

(3) The orifice of the valve has typically a sharp edge. Therefore, the friction loss therethrough is high and consequently the COP of the heat pump reduces. Since the flow coefficient of the orifice is low and the pressure difference created by a linear valve motion is large, the control of the refrigeration cycle tends to be unstable.

(4) Since the relationship between the pressure difference and the valve stroke is non-linear, a better control law is hardly implemented.

(5) An axial force is created across the expansion valve because of the pressure difference. In order to obtain a sufficient torque to overcome this force, a reduction gear may be incorporated between the motor and the valve body. As a result, the mechanism becomes complicated and problem arises with the controllability and response.

(6) It is hard to modify or change the control law which is programmed by hardware in the control unit. There is a limitation of further improving the controllability and efficiency.

SUMMARY OF THE INVENTION

It is, therefore, one of the objects of the present invention to provide a novel electronics expansion valve to alleviate the above mentioned problems encountered in the prior art electric expansion valve.

It is another object of the present invention to provide an electronic expansion valve having a wider operating range. The valve operates from the fully closed position to the fully open position in which a friction loss therethrough is substantially zero.

It is a further object of the present invention to provide an electronic expansion valve in which a liquid passage or an orifice is so arranged that the refrigerant can flow in either of two possible flow directions. Therefore, only one expansion valve is used both for the heating and cooling modes without the use of a four-way valve.

It is still a further object of the present invention to provide an electronic expansion valve in which the orifice shape is streamlined so that the friction loss therethrough is minimal and thermal insulation characteristic with respect to the exterior is improved and therefore the coefficient of performance of the heat pump system may be improved, and because of the streamlined shape, the flow coefficient of the orifice is larger and the pressure sensitivity to the rectilinear valve motion is less so that the stable control is easily achieved.

It is yet a further object of the present invention to provide an electronic expansion valve in which the shapes of a valve body so arranged that the relationship between the pressure difference across the valve and the valve stroke can be made linear, whereby the control law may be easily implemented.

It is still a further object of the present invention to provide an electronic expansion valve in which a valve body is so configured and a pressure equalizing tube is so connected between high- and low-pressure sides that almost no external force can act on the valve pintle, whereby a stepping motor can be directly connected to the valve body without the use of a reduction gear and consequently the expansion valve becomes small, simple and low-cost, with higher response and finer control characteristics.

It is still a further object of the present invention to provide an electronic expansion valve in which the control law is implemented by software so that a damping signal can be included for a stable operation and thereby the cotrol flexibility is enhanced.

In order to achieve these objects, an electronic expansion valve according to the present invention comprises (a) a valve casing; (b) a stepping motor; (c) a motion conversion member for converting the rotational motion of the stepping motor to a screw motion; (d) a valve pintle coupled to the motion conversion means to be rectlinearly displaced and having pistons at both ends of the valve pintle, the pistons being slidably supported on the valve casing; (e) a valve body formed as an integral part of the valve pintle at an intermediate portion thereof; and (f) a valve seat which has such an outer surface that when the valve pintle is displaced with respect to the valve seat in either direction, the cross sectional area and the shape of a passage defined between the valve seat and the valve pintle are smoothly varied.

It is preferable that the shape of the valve body and the shape of the valve seat are so defined that the relationship between the stroke of the valve pintle and the pressure difference across the valve body is substantially linear.

The valve body may be in the form of spindle and the valve seat in the form of venturi.

It is preferable that the cross sectional area of each of the pistons connected to the valve pintle which are slidably supported is equal to the maximum cross sectional area of the valve body.

Preferably, the chambers defined by the valve casing and the end portions of the pistons which are slidably supported by the valve casing are liquid-tightly sealed and the chambers thus defined are intercommunicated through a pressure equalizing tube.

It is preferable that the valve body and the valve seat are so defined that the valve body can be seated on the valve seat to completely close the expansion valve.

It is preferable that the pressure difference between the upstream and downstream of the passage can substantially be zero when the valve is fully opened.

It is also preferable that an electronic expansion valve according to the present invention further comprises arithmetic means in the form of a microcomputer. The displacement of the valve pintle is controlled in response to a software stored in a read-only memory of the microcomputer, and a damping signal is calculated using the microcomputer as a part of a control signal for displacing the valve pintle.

DETAILED DESCRIPTION OF THE PREFERRED EMBODIMENT

The above objects are achieved by the principle underlying the present invention which will be discussed in the following.

An expansion valve is used to create a desired pressure difference across the expansion valve by permitting the flow of a predetermined amount of cooling and heating fluid medium or refrigerant which changes its phase between liquid and vapor. The flow is governed by the isenthalpic, adiabatic and irreversible conditions. The term "isenthalpic" is used herein to refer to the condition where the decrease in internal energy of the refrigerant is equal to the increase in the energy associated with the pressure multiplied by specific volume, thus, the value of the enthalpy stays constant.

Furthermore, the expansion valve operates under the adiabatic and irreversible conditions. In the closed system, the entropy is inevitably increased as a result of the generation of eddies and friction against the wall. The irreversible change will occur whenever there is thermal imbalance due to free expansion, generation of eddies, friction or thermal conduction due to a certain amount of temperature difference. For instance, the irreversible change in an adiabatic system which neither receive nor reject heat from or to the outside environment is not an isentropic change but an irreversible adiabatic change. The entropy of the system is increased, whenever compression or expansion process is taking place.

Therefore, the load on the compressor will be increased in response to the increase in entropy created by the expansion valve under the irreversible adiabatic condition. Assume now that the refrigeration cycle be a reversible cycle and let Lm denote the minimum work necessary for the reversible cycle. Then, from Gibbs free energy theorem, the following Equation (1) is derived.

$$-Lm = G_2 - G_1 \quad (1)$$

where $G_1$ and $G_2$ are free energies at the inlet to and the outlet from the expansion valve. The minimum work Lm has a negative sign because in the case of the refrigeration cycle the directions of the thermal and refrigerant flow are reversed, compared with those for engines.

Next, assume that the evaporating temperature be equal to the atmospheric temperature To (absolute temperature) and let H denote the internal energy and S, the entropy. Then, the free energy G is given by $$G = H - T_0 S \quad (2)$$

Let $H_1$ and $H_2$ be the internal energy and let $S_1$ and $S_2$ the entropy each corresponding to the free energy $G_1$ and $G_2$. Then from Equations (1) and (2), Equation (3) is obtained.

$$Lm = (H_1 - H_2) - T_0(S_1 - S_2) \quad (3)$$

However, in a real refrigeration cycle, the expansion valve receives work under the irreversible condition. Therefore, let ΔS denote the increment of entropy and let $S_1'$ denote the entropy at the downstream of the expansion valve. Namely, $$S_1' = S_1 + \Delta S \quad (4)$$

Let L denote the actual work done and substituting Equation (4) for $S_1$ in Equation (3), we have $$L = (H_1 - H_2) - T_0(S_1 + \Delta S - S_2) \quad (5)$$

Let ΔL denote the increment of work due to the irreversible change in the expansion valve. Then from Equations (3) and (5), we have $$\Delta L = L - Lm = -T_0 \cdot \Delta S \quad (6)$$

The negative sign represents the increase of work to the system. That is, because of the irreversible change in the expansion valve, the load on the compressor is increased by $T_0 \cdot \Delta S$ in the form of work.

The expansion valve operates under the irreversible condition as described above in which the entropy is always increased and additional work corresponding to the increase of entropy is required to the cycle.

So far, the irreversible change in the expansion valve is described as an adiabatic change, but in practice it is to be understood that an irreversible change always accompanies heat exchange between the system and the exterior which deviates from an ideal adiabatic change. For instance, the heat exchange between a fluid and pipe is greater for the turbulent flow than for the laminar flow. Furthermore, in the case of the orifice flow, the smaller the flow coefficient, the greater the amount of heat exchange between the fluid and the outer wall of the orifice. Because of such heat exchange, both the enthalpy and entropy of the refrigerant increases and the enthalpy and entropy increases are translated into an excess work required for the heat pump system.

The present invention was made under the above described principle. According to the present invention, the orifice shape which is created by the a valve body and a seat is streamlined so that the conditions under which the irreversible change occurs are minimized as much as possible and consequently the flow coefficient of orifice is maximized. The increase in entropy is thus reduced and the coefficient of performance of the refrigeration cycle will be improved.

Figures 1, 2:
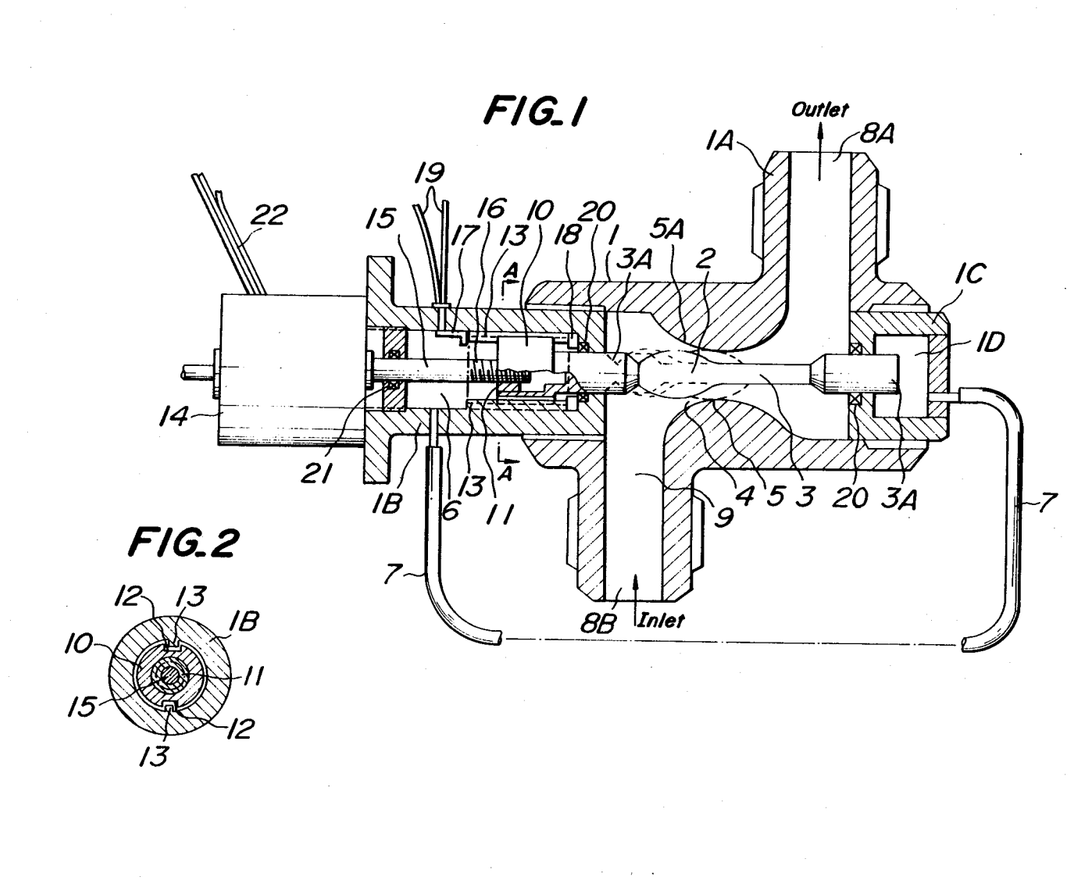
FIG. 1 is an axial sectional view showing an embodiment of an electronic expansion valve in accordance with the present invention.
FIG. 2 is a cross sectional view taken along the line A—A of FIG. 1 and FIG. 1A.

FIG. 1 shows an embodiment of an electronic expansion valve in accordance with the present invention. Since it is controlled by a digital control system, it is best suited for a refrigeration cycle with the heating and cooling modes. A valve casing indicated by reference numeral 1 comprises three valve casing members 1A, 1B and 1C which are threadably engaged with each other. A spindle-shaped valve body 2 is formed in the middle of a pintle 3 as an integral part thereof. The casing member 1A is formed with a venturi-tube-shaped valve seat 5 so that an orifice or streamlined flow passage 4 can be defined between the spindle-shaped valve body 2 and the valve seat 5. The maximum diameter of the spindle-shaped valve body 2 is equal to the throat diameter of the venturi-tube-shaped valve seat 5, so that when the expansion valve is closed, the spindle-shaped valve body 2 can liquid-tightly fit with the valve seat 5.

The curved portion 5A which is located upstream or downstream of the valve seat 5 is divergently shaped at a gentle angle.

In response to the axial displacement of the pintle 3, the cross sectional area of the orifice 4 can be varied. The orifice 4 is defined by a smooth curved surface. Consider the expansion valve is gradually opened. When the pintle 3 is displaced from the right to the left in FIG. 1, the valve body 2 is displaced from the position indicated by the dotted lines to the position indicated by the solid lines and then to the position indicated by the datted and dashed lines. The cross sectional area of the flow passage at the valve seat 5 is increased in proportion to the valve stroke. In this specification, the term "center position" of the orifice 4 is used to refer to a position at which the distance between the curved portion 5A of the valve seat 5 and the spindle-shaped valve body 2 becomes minimum. As the pintle 3 is displaced to the left, the "center position" of the orifice 4 is also displaced to the left. Therefore, when both the surface of the curved portion 5A and the surface of the spindle-shaped valve body 2 are suitably shaped, the relationship between the valve stroke and the cross sectional area of the orifice 4 can compensate for the non-linear relationship between the pressure difference across the orifice and the cross sectional area of the orifice 4. In other words, the relationship between the pressure difference across the orifice and the valve stroke can be made substantially linear. In addition, the cross section of the orifice 4 can always be maintained streamlined regardless of the valve position so that the generation of eddies and the friction against the valve surface can be minimized, which results in a relatively large flow coefficient.

Theoretical reasoning will be set forth in the following as to why the relationship between the pressure difference across the orifice and the valve stroke can be made linear. According to the Bernoulli's theorem, the following equation is given.

$$Q = C_d \cdot A \sqrt{\frac{2}{\rho} \Delta P} \qquad (7)$$

where
Q: volumetric flow rate
Cd: flow coefficient
A: the cross sectional area of the orifice
$\rho$: the density of the fluid
$\Delta P$: pressure difference across the orifice.

Rewriting Equation (7), we have $$\Delta P = \frac{\rho}{2} \left(\frac{Q}{C_d}\right)^2 \left(\frac{1}{A}\right)^2 \qquad (8)$$

It may be assumed in Equation (8) that the volumetric flow rate Q, the flow coefficient Cd and the density of fluid $\rho$ are constant. Then, $$\Delta P \propto \left(\frac{1}{A}\right)^2 \qquad (9)$$

Figure 4:
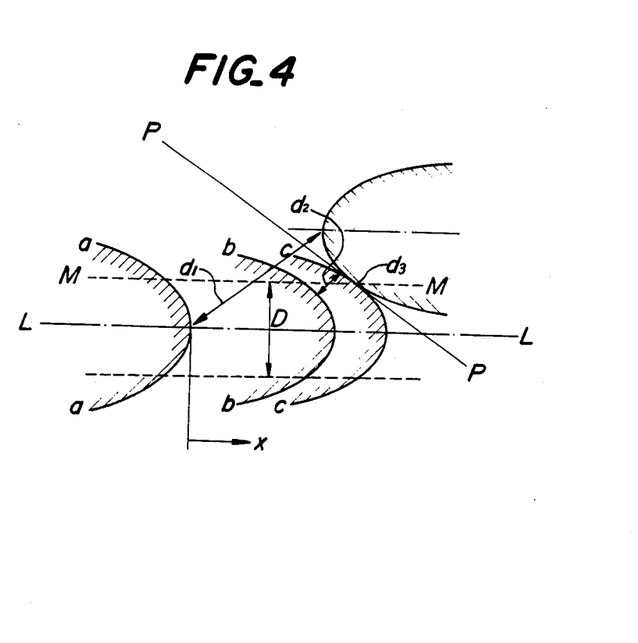
FIG. 4 is a sketch used in explaining the theoretical analysis made on the shapes of the a valve body and a seat so that a linear relationship between the pressure difference across the valve and the valve stroke can be achieved.

Consider now the relation shown in FIG. 4. Two identical surfaces of revolution are placed in opposed relationship with each other while their axis of revolution are offset by a predetermined distance. When these surfaces of revolution are moved toward each other along their axis, the clearance d of the orifice varies as indicated by $d_1$, $d_2$ and $d_3$ in FIG. 4 and it is a function of the lateral displacement x between the surfaces of revolution. We call x the valve stroke. As is clearly shown in FIG. 4, two surfaces of revolution are symmetrical so that the locus M—M of the center of the clearance d is spaced apart by a radius=D/2=(constant) from the center axis L—L of the left side surface of revolution.

It follows then $$\pi D = \text{constant} \qquad (10)$$

Now, the cross sectional area A of the orifice can be defined as follows:

$$A = \pi D d \qquad (11)$$

Hence, $$\left(\frac{1}{A}\right)^2 = \left(\frac{1}{\pi D d}\right)^2 = \left(\frac{1}{\pi D}\right)^2 \frac{1}{d^2} \qquad (12)$$

which leads to, $$\left(\frac{1}{A}\right)^2 \propto \frac{1}{d^2} \qquad (13)$$

From Equations (9) and (13), we have $$\Delta P \propto \frac{1}{d^2} \qquad (14)$$

Therefore, in order to attain the linear relationship between the pressure difference across the orifice and the valve stroke, the following relationship must be satisfied:

$$\Delta P \propto \frac{1}{d^2} \propto x \qquad (15)$$

According to Equation (15), a linear relationship between $1/d^2$ and x must be established. In other words, the spindle-shaped valve body 2 and the upstream curved portion 5A of the valve seat 5 must be so shaped that the valve stroke x has a linear relationship with $(1/d)^2$.

Referring now back to FIG. 1, the pintle 3 are connected with smooth and tapered transition surfaces to pistons 3A at both ends of the pintle 3. These pistons 3A are slidably supported by the casing members 1B and 1C as shown in FIG. 1 and the diameters of the pistons 3A are substantially equal to the maximum diameter of the valve body 2. The casing member 1C which supports the piston 3A is encased in a sealed chamber 1D. The sealed chamber 1D is communicated through a pressure equalizing tube 7 with a sealed chamber 6 enclosed by the casing member 1B, so that there exists no pressure difference between the sealed chamber 1D and the sealed chamber 6 even when the valve body 2 is being displaced. Reference numeral 8A designates an inlet to a fluid passage 9 and reference numeral 8B, an outlet therefrom, or vice versa. The high- and low-side pressures acting on the valve body 2 in the axial direction of the pintle 3 is always balanced with the high- and low-side pressures acting on the pistons 3A regardless of the refrigerant flow direction. As a result, when the valve is to be opened or closed, the valve body 2 can be driven along the axial direction by an extremely small driving torque generated by a driving mechanism to be described later. Since the expansion valve of the present invention has bi-directional characteristic, it can efficiently be used both for the heating and cooling modes.

The driving mechanism will now be described in detail.

Reference numeral 10 designates a valve body driving member formed as an integral part with one end (the left end in FIG. 1) of the piston 3A and a nut 11 is securely fastened to the driving member 10. As shown in FIG. 2, axial grooves 12 are provided on the outer surface of the driving member 10 which are located in a diametrically opposed relationship with each other. Guide rails 13 which are mounted inside valve casing member 1B in the axial direction are slidably fitted into the guide grooves 12 on the driving member 10. Therefore, the driving member 10 can slide along the guide rails 13. The nut 11 inserted in the driving member 10 is engaged with a thread 16 on an output shaft 15 of a stepping motor 14. Therefore, the rotational motion of the stepping motor 14 can be converted into the axial motion of the driving member 10 and consequently the valve body 2 is driven in the axial direction to change the valve opening.

Reference numeral 17 designates a limit switch and reference numeral 18, a stopper. Assume that the driving member 10 be driven to the left in FIG. 1 so that the valve body 2 is brought to the position indicated by the dotted and dashed line. Then, the driving member 10 engages with the limit switch 17 so that a signal is transmitted through lead wires 19 to a digital control unit 30 (See FIG. 3) and consequently the stepping motor 14 is deenergized. When the driving member 10 is driven rightward in FIG. 1 and engages with the stopper 18, the valve body 2 is brought to the position indicated by the dotted line, where the expansion valve is completely closed. The stepping motor 14 is then deenergized. The sealed chambers 6 and 1D enclosed by the casing members 1B and 1C are respectively liquid-tightly sealed from the fluid passage 9 by sealing means 20 such as a gland packing or the like so as to accommodate both sides of the piston 3A of the pintle 3. Sealing means 21 such as an O ring is also disposed at the sealed chamber 6 enclosed by the casing member 1B to accommodate the output shaft 15 of the stepping motor 14.

Figure 1A:
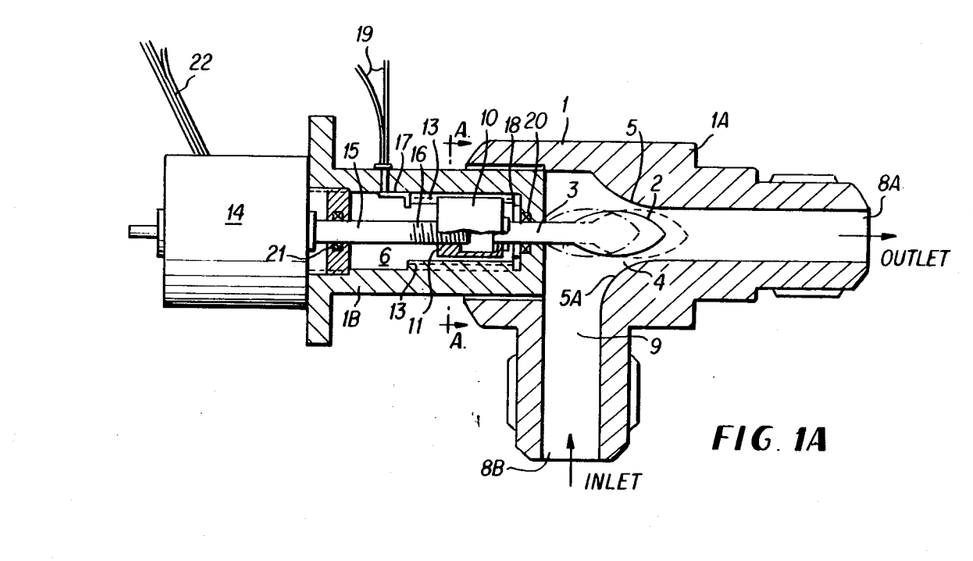
FIG. 1A is an axial sectional view showing another embodiment of an electronic expansion valve in accordance with the present invention.

In FIG. 1A, another embodiment of an electronic expansion valve is shown. In this figure, like numerals correspond to those of FIG. 1. This specific embodiment does not have pressure equalizing mechanisms and the chamber 6 is sealed completely from the outside. The pintle 3 is slidably supported on the valve casing 1B at one point in a coaxial relation with the longitudinal axis of the valve casing 1B. The other end of the valve pintle 3 comprises a free end forming an orifice 4 with the valve seat 5.

Next, with reference to FIG. 3, an embodiment of the digital control unit 30 for driving the electronic expansion valve will be described in detail. As shown by the broken line in the figure, the digital control unit 30 is interfaced with peripheral devices. At least more than two temperature sensors 31 and/or pressure transducers 32 are required for a refrigeration cycle to give input signals to the digital control unit 30. The output signal from the digital control unit 30 is applied to the stepping motor 14 attached to the electronic expansion valve. The outputs from the temperature sensors 31 and/or pressure transducers 32 are sampled by a multiplexer 33, the output of which is applied to a sample hold 34. The output from the sample hold 34 is then applied to an A/D converter 35, the digital output of which is applied through a first input-output port 36A to a CPU 37. The CPU 37 performs arithmetic operations required for controlling the valve opening in accordance with the program written in a ROM 38 utilizing the data temporarily stored in a RAM 39. The output from the CPU 37 is applied through a second input-output port 36B to a driver 41 where the current amplification is made and the driving output thus obtained drives the stepping motor 14. The rotational angle of the stepping motor 14 is stored in the form of digital information in a counter 40 within the CPU 37. A pulse train representative of a control signal is generated from the digital control unit 30 and applied through lead wires 22 (See FIG. 1) to the stator windings of the stepping motor 14. By applying a pulse train continuously through a plurality of lead wires 22 to the stator windings, the stepping motor 14 can be positioned at a desired position even though it is subjected to external disturbance torques. When the refrigeration cycle is disengaged, the valve body 2 is brought to the fully closed position as indicated by the dotted line in FIG. 1. That is, the stepping motor 14 is rotated by the digital control unit 30 until the driving member 10 engages with the stopper 18.

Figure 3:
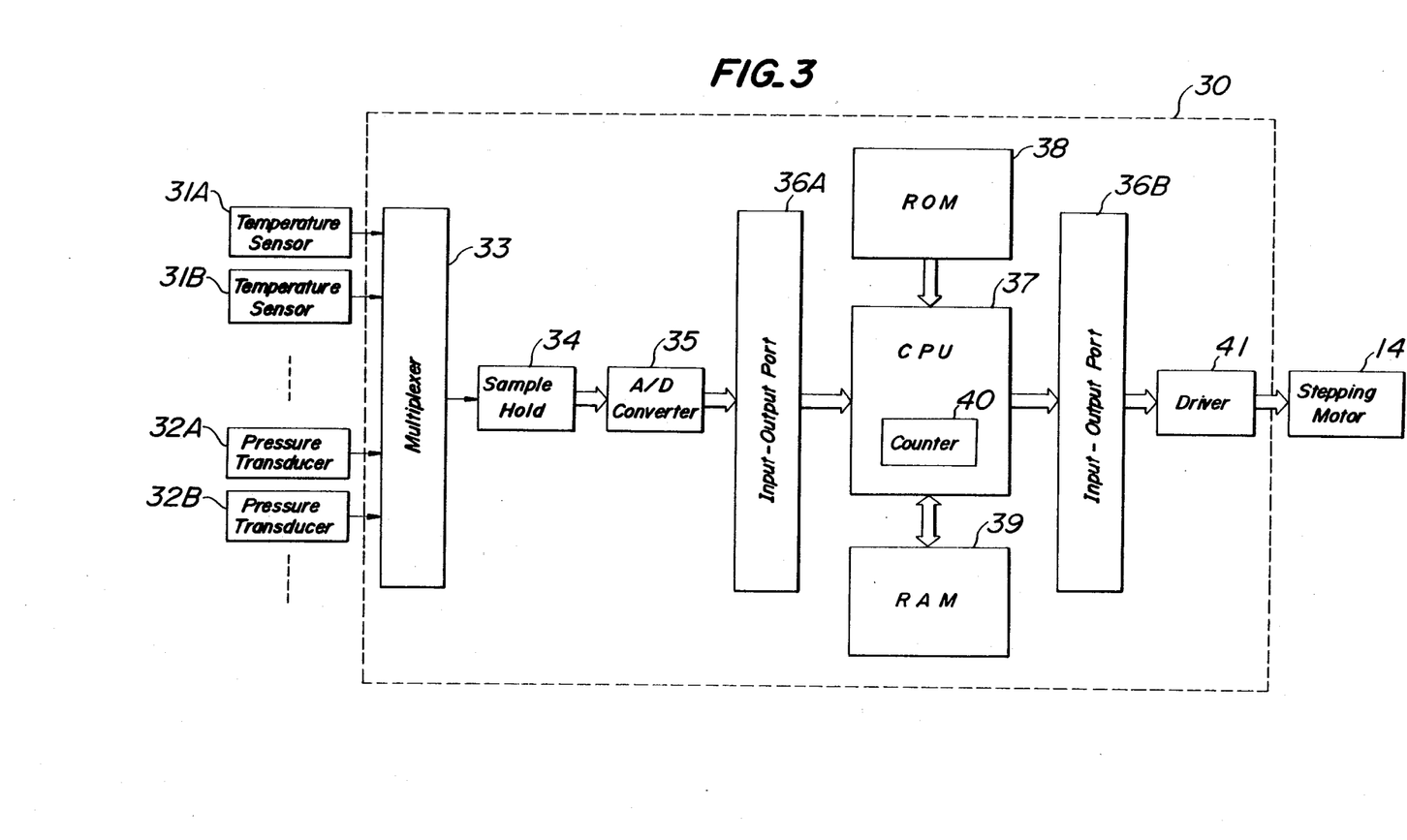
FIG. 3 is a block diagram showing an embodiment of a digital control unit.

In FIG. 3, LSI 6520 may be used as the input-output ports 36A and 36B. LSI 6502 may be used as the microprocessor 37. LSI 2714 may be used as the ROM 38. LSI 2716 may be used as the RAM 39.

Figure 5:
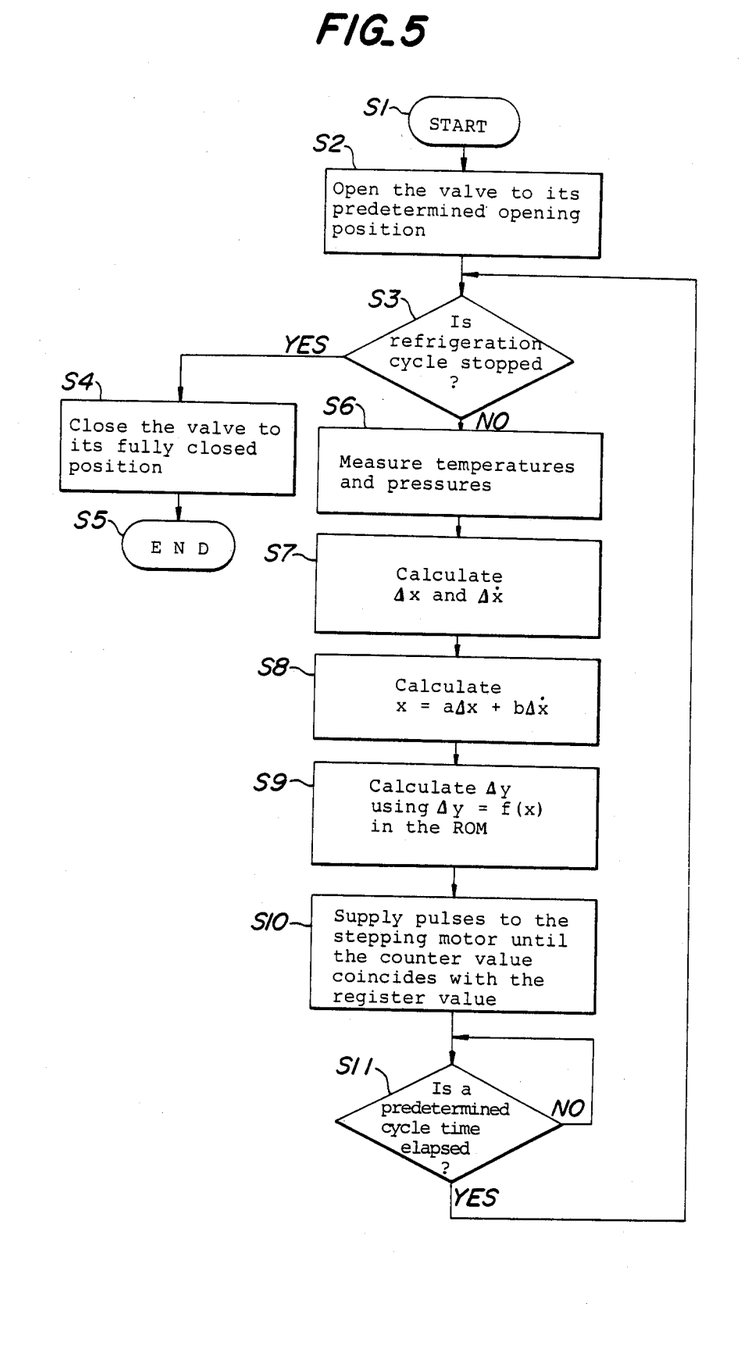
FIG. 5 is a flow chart showing one example of operational steps of an electronic expansion valve in accordance with the present invention.

Next, the operation of the electronic expansion valve according to the present invention will be explained with reference to a flow chart shown in FIG. 5. A refrigeration cycle is activated in step S1. Then, in step S2, the expansion valve is driven to its predetermined opening position. Then the operational flow proceeds to step S3, where the judgement is made as to whether the refrigeration cycle is disengaged or not. If it is judged affirmatively, the flow goes to step S4, in which the expansion valve is driven to its fully closed position and then the refrigeration cycle is deenergized in step S5. On the other hand, if the judgement is negative in step S3, the flow proceeds to step S6, where the temperatures and pressures at various portions of the refrigeration cycle are measured by the temperature sensors and/or pressure transducers. Using the measured data in step S6, the superheat deviation from an ideal value $\Delta x$ and the derived time rate $\Delta \dot{x}$ thereof are calculated by the CPU 37 using digital filtering technique in step S7. Then, in step S8, an effective superheat deviation $x = a\Delta \dot{x} + b\Delta \dot{x}$ is calculated by using the weighting coefficients a and b. In the succeeding step S9, the table stored in the ROM 38 is looked up to determine the incremental number of pulses $\Delta y$ by using a relation, $\Delta y = f(x)$. The number of pulses $\Delta y$ thus determined is added to the content of the register in the CPU 37. Succeedingly, in step S10, the series of pulses are applied to the stepping motor 14 until the content of the counter 40 coincides with the value stored in the register. When these values are coincident, it is then judged whether a predetermined cycle time is elapsed or not in step S11. If the judgement is negative, the step S11 is repeated until the affirmative judgement is made. Then, the flow returns to step S3 to repeat the above sequence of steps S3 through S11.

Figure 6:
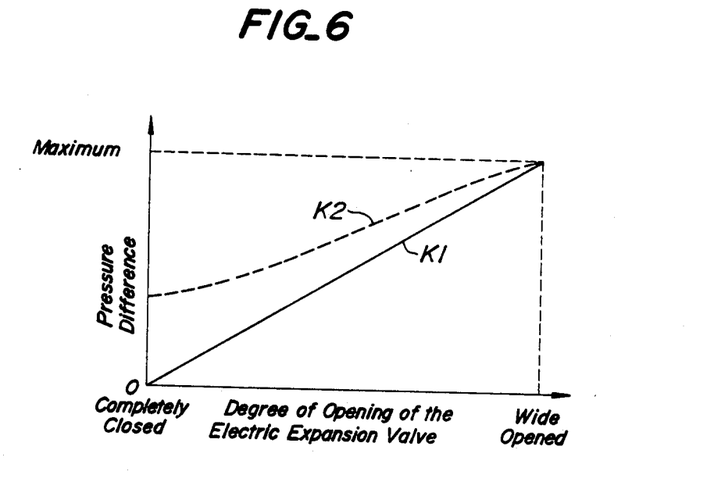
FIG. 6 is a diagram showing comparative relationships between the pressure difference and the valve stroke for an electronic expansion valve in accordance with the present invention and a conventional solenoid-operated expansion valve.

FIG. 6 shows the relationship between the valve opening and the pressure difference across the output port 8A and the inlet port 8B. The ideal relationship between them is illustrated by the solid line $K_1$. The valve opening is plotted along the abscissa, the right end indicating the fully closed position of the valve while the origin indicating its fully open position. The pressure difference is plotted along the ordinate. As shown, the pressure difference is zero when the electronic expansion valve 1 is wide opened, while the pressure difference becomes maximum when the valve is completely closed.

When the refrigeration cycle is deactivated, the valve is located at its fully closed position. When the refrigeration cycle is activated, the digital control unit 30 drives the stepping motor 14 so that the valve is opened to obtain the optimum pressure drop across the orifice for a given external condition. In order to do this, the counter 40 within the digital control unit 30 counts the number of pulses applied to the stepping motor 14 and when the counter 40 counts a predetermined number of pulses, the digital control unit 30 stops the stepping motor 14 and the desired valve opening position is obtained. The spindle-shaped valve body 2 is moved toward or away from the valve seat 5 to create the optimum pressure difference across the output and inlet ports 8A and 8B of the fluid passage 9 for a given external condition. The maximum pressure difference obtainable when the valve is completely closed is dependent on the rotational speed of a compressor, the operating temperatures and so on. Between the fully closed and fully open valve positions, the pressure drop or difference across the spindle-shaped valve body 2 can be made substantially linear as a function of the valve stroke, as indicated by the straight curve $K_1$. Because the pressure difference is substantially zero when the valve is fully opened, a solar collector can be accomodated in the refrigeration cycle to create an extremely high evaporating temperatures, thereby reducing the power required for driving the compressor reduced to a minimum.

The broken line curve $K_2$ in FIG. 6 shows the characteristic curve of a solenoid-operated expansion valve indicating the relationship between the pressure difference and the valve stroke. It is noted that the pressure difference will not become zero, even if the solenoid-operated expansion valve is fully opened. As a result, the system performance is degraded to overcome the residual pressure difference when zero pressure difference is actually desired in a specific system configuration and condition.

Figure 7A:
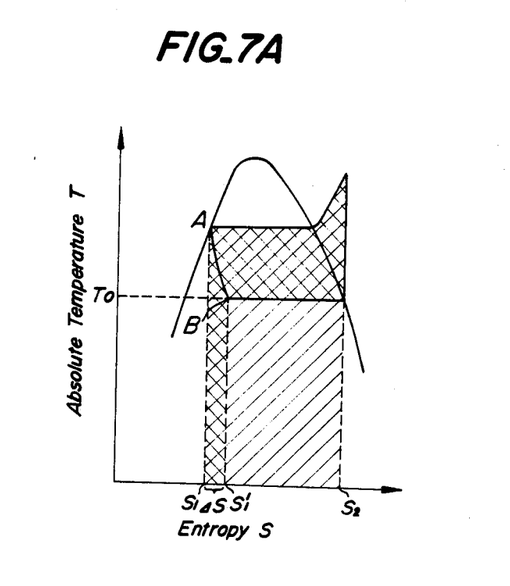
FIG. 7A is a temperature-entropy diagram showing the refrigeration cycle in the heating mode in which a conventional solenoid-operated expansion valve is used.
Figure 7B:
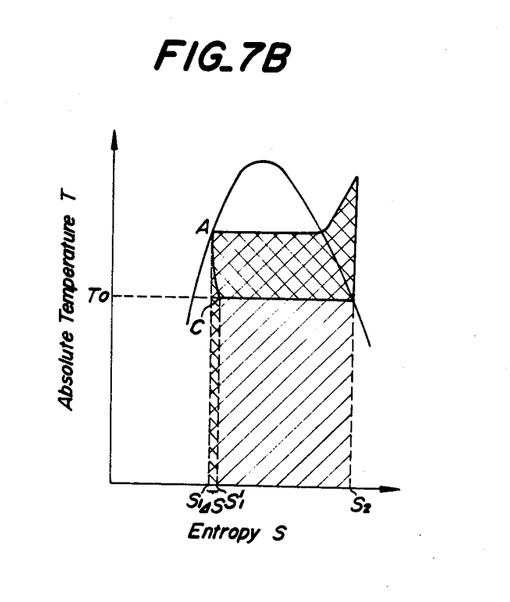
FIG. 7B is a temperature-entropy diagram showing the refrigeration cycle in the heating mode in which an electronic expansion valve in accordance with the present invention is used.

FIG. 7A shows the temperature-entropy diagram in the heating mode when a conventional expansion valve is used while FIG. 7B shows the diagram when the electronic expansion valve in accordance with the present invention is used. In general, friction always exists in expansion valves as a result of expansion, the entropy of a liquid refrigerant is inevitably increased. Therefore, the entropy increases as indicated by the curve A-B in FIG. 7A, as the temperature drops. The COP of such a cycle can be represented by the ratio of the hatched plus double hatched area to the double hatched area.

The expansion valve in accordance with the present invention has a smooth orifice so that the friction is minimal. Therefore, the T-S diagram as shown in FIG. 7B is obtained. It is noted that the entropy increase due to expansion represented by line A-C is less compared to FIG. 7A.

Furthermore, since the friction loss is minimal according to the present invention, the heat transfer between the valve casing and the valve body is less. Therefore, the enthalpy and entropy increases due to the heat transfer is less compared with the conventional orifice. Therefore, the system COP can be improved as compared with the cycle showing FIG. 7A, which enables a heat pump with a higher efficiency. The same explanation can be made for the cooling mode.

According to the present invention as described above, the orifice shape is smooth compared with the prior art, so that the flow coefficient becomes high. Therefore, a finer pressure control can be achieved with a given valve stroke. As a result, the more precise control can be made in response to a small stepwise angular movement of the stepping motor. Furthermore, the response time is minimal compared with the prior art electronic expansion valves enabling a faster and stable control. The rate signal representative of the temperature variations can be calculated by the digital control unit and can be applied as a damping signal to the stepping motor, thereby resulting in a higher stability of the system.

Furthermore, since no mechanical means is interposed between sensor and actuator means, undesirable non-linear characteristics such as deadzones and hysteresis are mostly avoided. In addition, the valve body is moved toward or away from the valve seat by the screw motion of the stepping motor so that little power is needed for driving the unit which results in the simpler and smaller valve. Different from the prior art solenoid-operated expansion valves, in which control laws are incorporated in operational amplifiers, all control laws of the present invention are stored as a software in the memory means so that the refrigeration cycle can be always operated under optimum conditions. Moreover, the control laws can be modified easily.

As the digital control unit is used to drive the stepping motor directly, the system operation can be made over a widely changing external condition with a speed and precision. Moreover, since the force acting on the pintle is substantially eliminated compared to the prior art expansion valve, a small driving torque generated by the stepping motor is sufficient to open or close the valve. It is further noted that the expansion valve in accordance with the present invention is bi-directional.

What is claimed is:

1. An electronic expansion valve for use in a vapor compression refrigeration cycle to generate a desired pressure difference across a passage of said expansion valve for a given refrigerant mass flow, comprising:
 (a) a valve casing having a longitudinal bore;
 (b) a stepping motor having a threaded output shaft mounted on one end of said valve casing and being driven in a digital fashion;
 (c) a motion conversion member housed coaxially inside said valve casing and threadedly coupled to said output shaft of said stepping motor for converting the rotational motion of said stepping motor to an axial motion of said motion conversion member;
 (d) a valve pintle fixedly coupled to said motion conversion member to be axially displaced and having pistons at both ends of said valve pintle, said pistons being slidably supported on said valve casing in a coaxial relation with the longitudinal axis thereof;

(e) a valve body formed as an integral part of said valve pintle at an intermediate position thereof and in the form of a spindle; and (f) a valve seat comprising a part of the surface of said bore inside said valve casing in the form of a venturi and having an outer surface such that when said valve pintle is axially displaced with respect to said valve seat in either direction, the cross sectional area and the shape of the passage defined between said valve seat and said valve body are so varied that the inverse of the orifice area squared has a linear relationship with the stroke of said valve pintle whereby the relationship between the pressure difference across said valve body and said stroke is substantially linear.

2. An electronic expansion valve as claimed in claim 1, wherein the cross sectional area of each of said pistons connected to said valve pintle which are slidably supported is equal to the maximum cross sectional area of said valve body.

3. An electronic expansion valve as claimed in claim 2, comprising chambers defined by said valve casing and the end portions of said pistons which are slidably supported by said valve casing, said chambers intercommunicated via a pressure equalizing tube so that said chambers and said pressure equalizing tube altogether form a closed fluid system.

4. An electronic expansion valve as claimed in claim 3, wherein said valve body and said valve seat are so defined that said valve body can be seated on said valve seat to completely close the expansion valve.

5. An electronic expansion valve as claimed in claim 4, wherein the pressure difference between the upstream and downstream of said passage is substantially zero when said valve is fully opened.

6. An electronic expansion valve as claimed in claim 5, further comprising microcomputer means for controlling the displacement of said valve pintle, said microcomputer means comprising:

(a) means for measuring and storing temperatures and pressures at predetermined locations of said refrigeration cycle;

(b) a first computing means for calculating the superheat and derived superheat rate of said refrigeration cycle using said temperature and pressure data from said measuring and storing means and using a digital filtering technique;

(c) a second computing means for calculating an effective superheat by obtaining a weighted sum of said superheat and said derived superheat rate from said first computing means;

(d) a third computing means for calculating a a sequence and a number of pulses to be applied to said stepping motor as a function of said effective superheat by looking up a table stored in a read-only memory in said microcomputer; and (e) an outputting means for issuing pulse trains to said stepping motor until the valve of a counter in said microcomputer coincides with the value of a register in said microcomputer.

7. An electronic expansion valve for use in a vapor compression refrigeration cycle to generate a desired pressure difference across a passage of said expansion valve for a given refrigerant mass flow, comprising:

(a) a valve casing having a longitudinal bore;

(b) a stepping motor having a threaded output shaft mounted on one end of said valve casing and being driven in a digital fashion;

(c) a motion conversion member housed coaxially inside said valve casing and threadedly coupled to said output shaft of said stepping motor for converting the rotational motion of said stepping motor to an axial motion of said motion conversion member;

(d) a valve pintle fixedly coupled to said motion conversion member to be axially displaced and having one piston at one end thereof, said one piston slidably supported on said valve casing in a coaxial relation with the longitudinal axis of said valve casing, the other end of said valve pintle having a free end and forming an orifice with said valve seat;

(e) a valve body formed as an integral part of said valve pintle at an intermediate position thereof and in the form of a spindle; and (f) a valve seat comprising a part of the surface of said bore inside said valve casing in the form of a venturi and having an outer surface such that when said valve pintle is axially displaced with respect to said valve seat in either direction, the cross sectional area and the shape of the passage defined between said valve seat and said valve body are so varied that the inverse of the orifice area squared has a linear relationship with the stroke of said valve pintle whereby the relationship between the pressure difference across said valve body and said stroke is substantially linear.

8. An electronic expansion valve as claimed in claim 7, wherein said valve body and said valve seat are so defined that said valve body can be seated on said valve seat to completely close the expansion valve.

9. An electronic expansion valve as claimed in claim 8, wherein the pressure difference between the upstream and downstream of said passage is substantially zero when said valve is fully opened.

10. An electronic expansion valve as claimed in claim 9, further comprising microcomputer means for controlling the displacement of said valve pintle, said microcomputer means comprising:

(a) means for measuring and storing temperatures and pressures at predetermined locations of said refrigeration cycle;

(b) a first computing means for calculating the superheat and derived superheat rate of said refrigeration cycle using said temperature and pressure data from said measuring and storing means and using a digital filtering technique;

(c) a second computing means for calculating an effective superheat by obtaining a weighted sum of said superheat and said derived superheat rare from said first computing means;

(d) a third computing means for calculating a sequence and a number of pulses to be applied to said stepping motor as a function of said effective superheat by looking up a table stored in a read-only memory in said microcomputer; and (e) an outputting means for issuing pulse trains to said stepping motor until the value of a counter in said microcomputer coincides with the value of a register in said microcomputer.

* * * * *